VEHICULAR TUNNEL VENTILATION SYSTEMS

Filed June 6, 1950 4 Sheets-Sheet 1

INVENTOR.
BENJAMIN COOPER
STANLEY A. KROLL
BY J. B. Felshin
ATTORNEY

INVENTOR.
BENJAMIN COOPER
BY STANLEY A. KROLL
J. B. Felshin
ATTORNEY

VEHICULAR TUNNEL VENTILATION SYSTEMS

Filed June 6, 1950 4 Sheets-Sheet 3

INVENTOR.
BENJAMIN COOPER
BY STANLEY A. KROLL
J.B. Felshin
ATTORNEY

INVENTORS
BENJAMIN COOPER
STANLEY A. KROLL
BY
J. B. Felshin

United States Patent Office 2,726,594

Patented Dec. 13, 1955

2,726,594

VEHICULAR TUNNEL VENTILATION SYSTEMS

Benjamin Cooper, New York, and Stanley A. Kroll, Brooklyn, N. Y.; said Kroll assignor to said Cooper Application June 6, 1950, Serial No. 166,314

3 Claims. (Cl. 98—49)

This invention relates to vehicular tunnel ventilation systems and is particularly directed to systems for automatically ventilating a tunnel in response to both the carbon monoxide (CO) content of the tunnel air and the traffic density in the tunnel.

It is usual in vehicular tunnels to employ CO detectors or measuring apparatus to determine when the tunnel air is unsafe and in need of ventilation. Thus, in the usual case an employee in the tunnel CO control room, observing that the CO content of the air was greater than the amount allowable would telephone to the ventilation building and have the engineers start blowers or fans to increase the rate of ventilation in the tunnel.

If the air smelled foul or if the tunnel atmosphere was excessively hazy due to automobile exhaust smoke, the employee in the tunnel would relay this information to the ventilation building and the tunnel ventilating fans would be turned on or the ventilation rate otherwise increased.

This procedure is both costly, since it requires the services of at least one observer in the tunnel at all times, and inefficient in that it does not anticipate and correct the dangerous condition of poor visibility due to haziness before it arises, but depends upon the condition first arising before ventilation is begun or increased.

It is accordingly an object of this invention to provide a tunnel ventilating system that does not require a full time observer in the tunnel.

It is another object of this invention to provide a tunnel ventilating system that will anticipate the occurrence of dangerous and obnoxious air conditions and thereby cause ventilation to avoid them.

It is a further object of this invention to provide a system of the character described that can be set to automatically ventilate a tunnel so that the air within it is maintained substantially constant at below its maximum allowable CO content and at least at a certain minimum visibility because of haze due to automobile exhaust smoke.

It is a further object of this invention to provide an automatic tunnel ventilation system that is rugged and efficient, yet practical and comparatively inexpensive.

Other objects of this invention will in part be obvious and in part as hereinafter pointed out.

The invention accordingly consists in the features of construction, combination of elements and arrangement of parts which will be exemplified in the construction hereinafter described and of which the scope of this application will be indicated in the appended claims.

Figure 1:
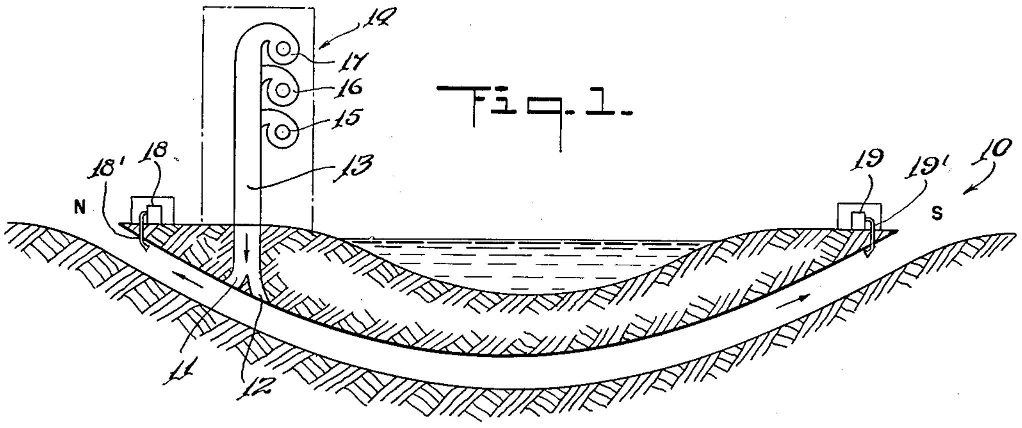
Figure 2:
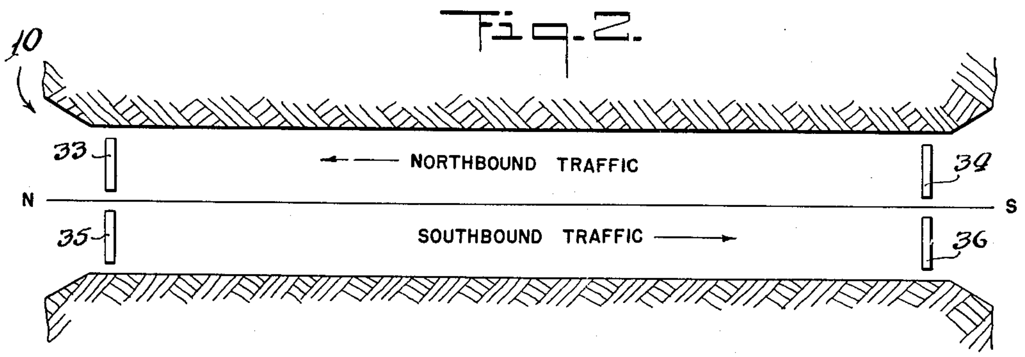
Figure 4:
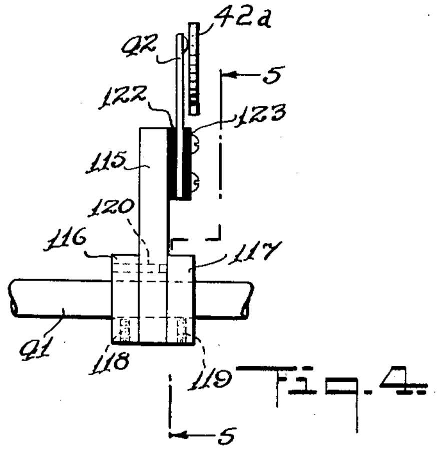
Figure 5:
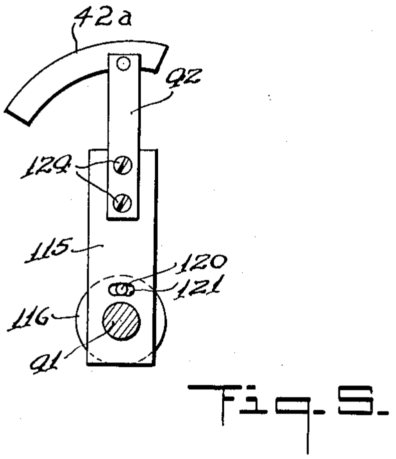
Figure 2:
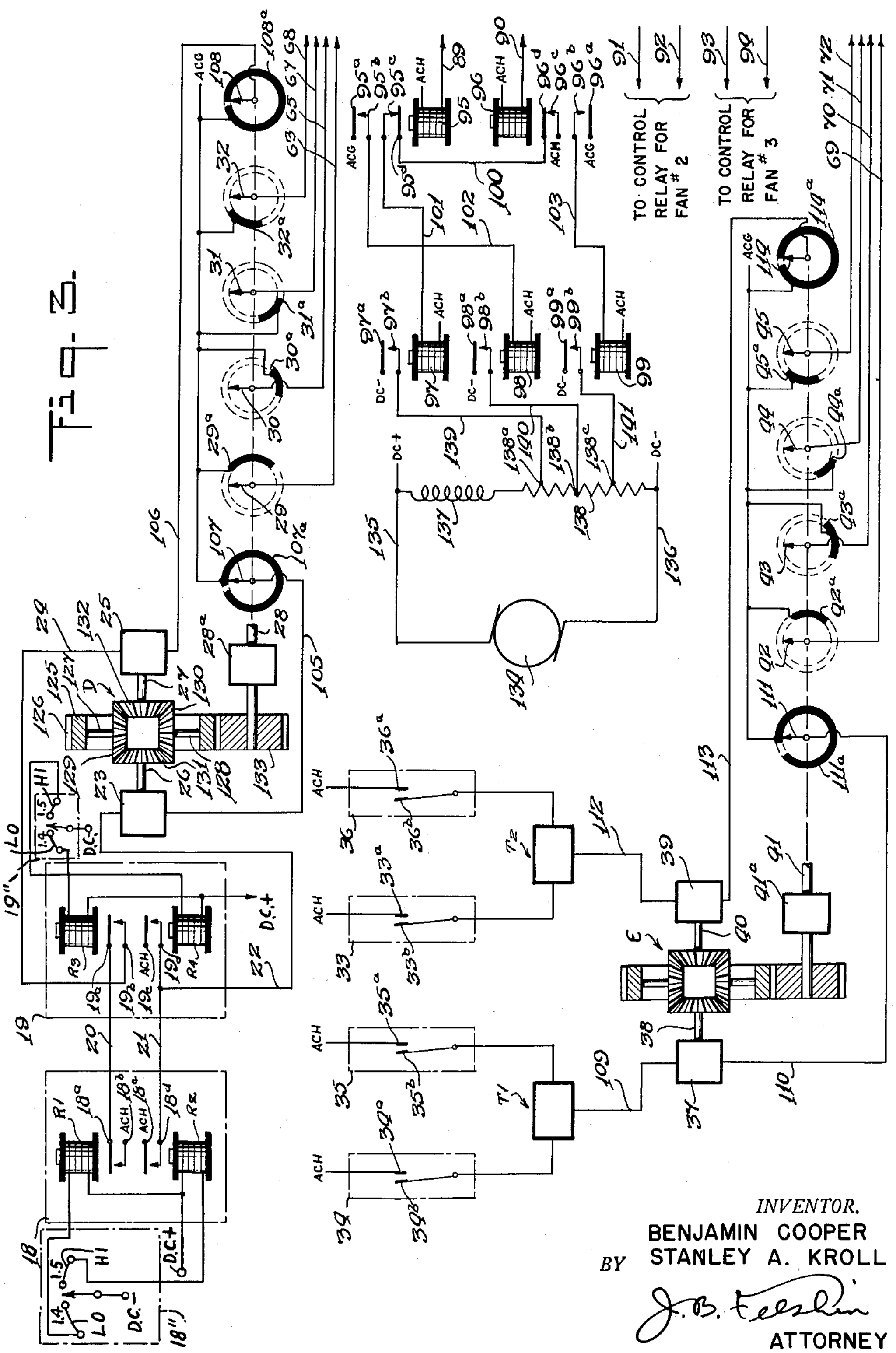
Figure 3A:
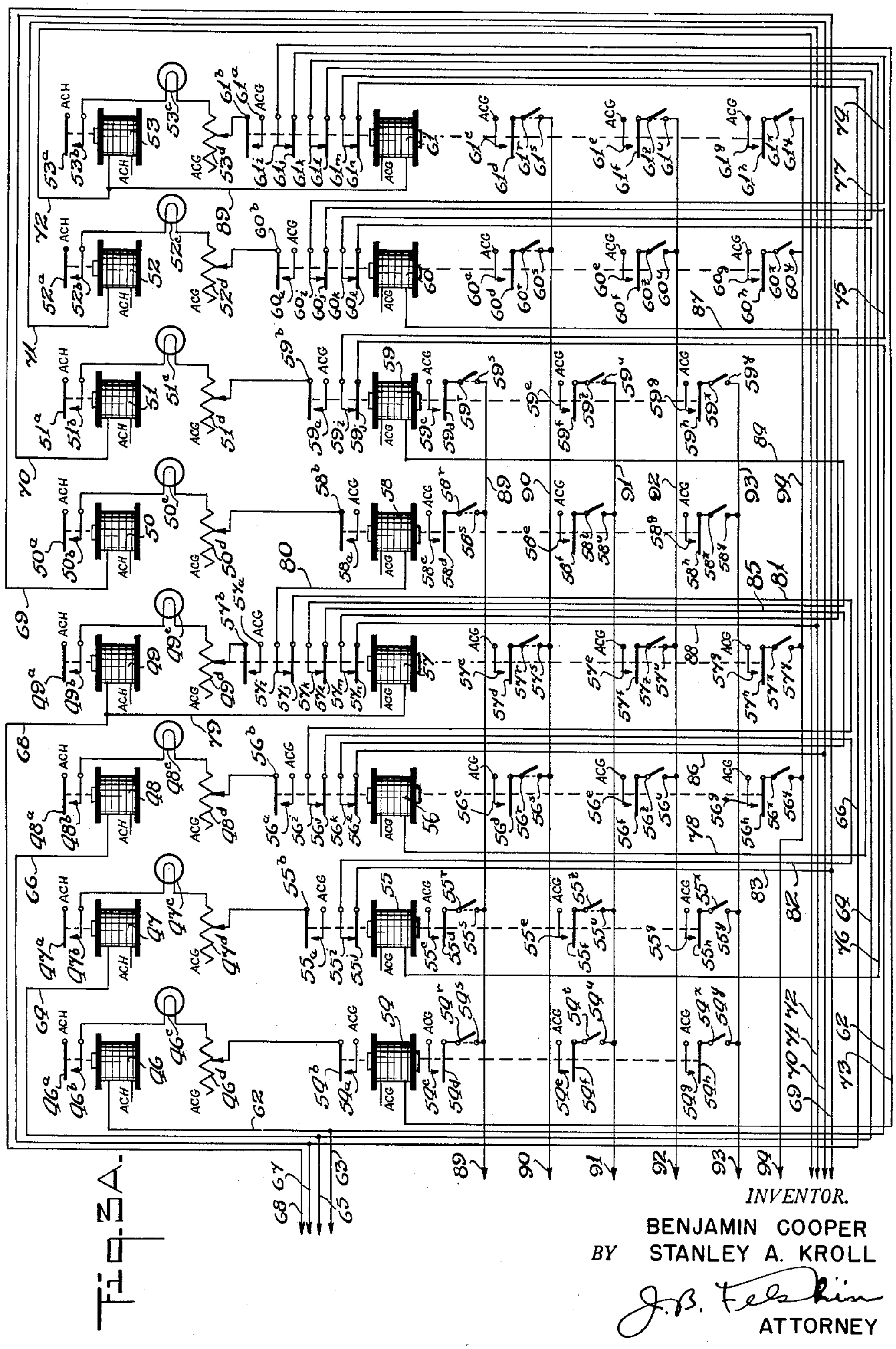

In the accompanying drawings, in which is shown one of the various possible illustrative embodiments of this invention, Fig. 1 is a cross-sectional view showing a tunnel under a river bed and a ventilation building for the tunnel, Fig. 2 is a plan view of a roadway in a tunnel, Figs. 3 and 3A taken together are a schematic diagram showing the electrical inter-connection of the ventilating system, Fig. 4 is a side view of one of the selector switch contact arms associated with the traffic density control circuit, and Fig. 5 is a sectional view taken on line 5—5 of Fig. 4.

Figure 6:
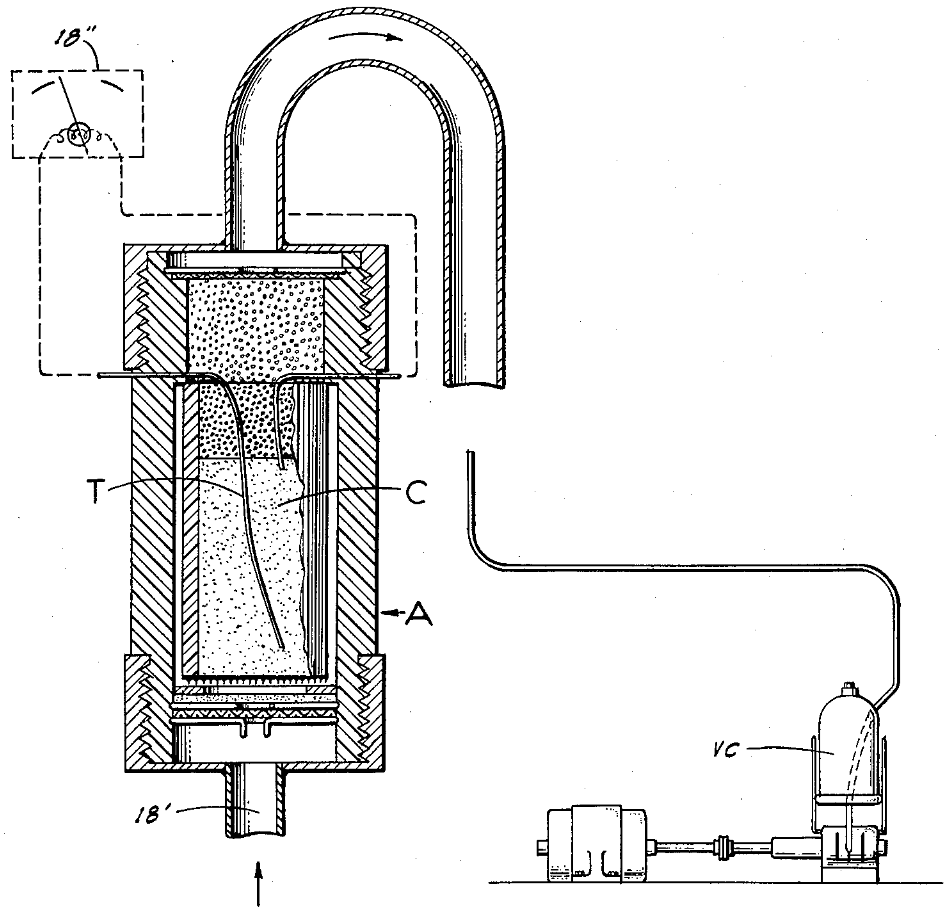

Fig. 6 is a sectional view illustrating a conventional carbon monoxide detector.

Referring now in detail to the drawings, Fig. 1 represents a vehicular tunnel 10, under a river bed and having, as an example, a north end N and a south end S. Ventilation building 14 houses fans or blowers 15, 16 and 17 adapted to ventilate the tunnel by blowing fresh air through the duct 13 and into the tunnel at openings 11 and 12, thereby forcing the vitiated air and smoke out at the ends of the tunnel N and S.

For the purpose hereinafter explained, the fans 15, 16 and 17 can be operated either separately or in combination, so that different rates of tunnel ventilation are possible. Moreover, each of the fan units 15, 16 and 17 may be operated at any one of three different speeds, thereby further multiplying the number of ventilation rates obtainable. As is hereinafter disclosed, the present invention automatically controls the speed of the three fans so that there is a salutary and safe atmosphere within the tunnel at all times.

Means is provided to control the tunnel ventilation in response to the density of CO in the tunnel air. To this end there is provided in the tunnel CO analyzers 18 and 19, one near each end of the tunnel, controlled by the CO content of a sample of tunnel exhaust air brought to said analyzers through the use of sampling tubes 18′ and 19′ (Fig. 1).

Said analyzers each have a pair of switches **18*a*, 18*b*, and 19*a*, 19*b*, respectively, adapted to be closed at a CO content of 1.4 parts or less in 10,000 parts of air and a pair of switches 18*c*, 18*d* and 19*c*, 19*d*, respectively, adapted to be closed at a CO content of 1.5 or more parts in 10,000 parts of air (Fig. 3). CO analyzer 18 is adapted to generate minute voltages in accordance with the CO content of the air samples drawn through sampling tubes 18′. These voltages are further amplified by conventional voltage amplifying means illustrated in block form and designated 18″**. An indicating device in said voltage amplifier responds in accordance with the amount of amplification of the minute voltages generated in the analyzer. Each of said indicating devices is further provided with one set of contacts that is disposed in engaged relation when the CO content of the sampled air is 1.4 parts or less in 10,000 parts of air. A second set of contacts is arranged to be closed upon the CO content rising to 1.5 or more parts in 10,000 parts of air. Therefore, both sets of contacts are open when a CO content of 1.4 to 1.5 parts in 10,000 parts of air is established. It is readily evident that some means of ventilation must always be present in vehicular tunnels, accordingly, some fans will always be operating. As will be hereinafter appearing this continuous fan operation is defined as a normal speed of fan operation.

Such a CO analyzer device is described in Technical Paper 582 of the Bureau of Mines, pages 11 to 16, wherein a varying output current is produced which is proportional to the CO content of the air analyzed. In the present invention the respective lower CO content switches in the analyzers 18, 19 are connected in series with a power source and one of the respective relays R1 and R3. The respective high CO content switches are similarly connected in series with said power source and one of the relays R2 and R4. Accordingly, analyzer 18 disposed at one end of the tunnel controls switches **18*a*–18*b* and 18*c*–18*d*, while analyzer 19 disposed at the opposite tunnel end controls switches 19*a*–19*b* and 19*c*–19*d*. The closure of the CO controlled switches energizes relays R1, R2, R3 and R4, controlling the switches 18*a*, 18*b*; 18*c*, 18*d* and 19*a*, 19*b*; 19*c*, 19*d*** so as to operate them as set forth above.

A typical CO detector is shown in Figure 6 of the drawings wherein a vacuum pump VC draws air samples through sampling tubes 18′ or 19′. The sample air is then passed through an analyzer cell A having a thermopile T imbedded in a catalyst C. The carbon monoxide in the sample is converted to carbon dioxide upon contacting the catalyst and this exothermic reaction generates heat that is proportional to the concentration of carbon monoxide in the sample. This heat generates a voltage in the thermopile which controls amplifier device 18″ in one instance and amplifies device 19″ in the other instance. Such a detector is completely disclosed in the pending application, Serial Number 215,846, entitled, "Apparatus for the Continuous Quantitative Determination of Gases" and need not be described in detail herein.

Switch contacts 18*b*, 18*c* and 19*c* are connected to one terminal of a source of A. C. supply voltage ACH. Switch terminals 18*a* and 19*a* are interconnected by a wire 20; and switch terminals 18*d* and 19*d* are interconnected by a wire 21. Switch terminal 18*d* also connects by wire 22 to a motor 23. Switch terminal 19*b* connects by wire 24 to a motor 25. The remaining terminals of said motors are connected respectively by wires 105 and 106 to normally closed limit switches 107, 107*a* and 108, 108*a* and thence to the other terminal of the source of supply voltage ACG. It is evident that when either or both of switches 18*c*, 18*d* and 19*c*, 19*d* are closed, as happens when the CO content in the tunnel air near either or both ends is greater than the allowable 1.5 parts of CO in 10,000 parts of air an energizing circuit is completed to motor 23 to rotate shaft 26 to increase ventilation, as hereinafter described. This circuit can be traced either from ACH through switch 18*c*, 18*d*, wire 22 through motor 23, wire 105 and limit switch 107, 107*a* to ACG; or from ACH through switch 19*c*, 19*d*, wire 21, wire 22, through motor 23, wire 105 and limit switch 107, 107*a* to ACG.

When both switches 18*a*, 18*b* and 19*a*, 19*b* are closed, as happens when the CO content in the tunnel air near either or both ends is less than 1.4 parts in 10,000 an energizing circuit will be completed to motor 25 to turn shaft 27 in a direction to decrease ventilation as is hereinafter described. This energizing circuit can be traced from ACH through switch 18*a*, 18*b*, wire 20, switch 19*a*, 19*b*, wire 24 through motor 25, wire 106 and limit switch 108, 108*a* to ACG. It is also evident that when the CO content of the air in the tunnel is between 1.4 and 1.5 parts in 10,000, none of the above CO analyzer switches will be closed and the motors 23–25 will be at rest.

Motor shafts 26 and 27 are coupled to a differential mechanism D which in turn is connected to a gear reduction box 28*a* having an output shaft 28, greatly reduced in speed, reflecting an angular displacement that is the difference between the angular displacements of input shafts 26 and 27. Thus, if shaft 26 is rotated 10,000 revolutions while shaft 27 is stationary, output shaft 28 will rotate to an angular displacement proportional to the rotation of shaft 26. If shaft 26 is thereafter held stationary and shaft 27 rotates 10,000 revolutions, the output shaft 28 will turn back to its original position, the angular "differential" between shafts 26 and 27 now being zero.

Said differential mechanism comprises a ring gear 125 having external teeth 126 and having securely mounted within its central opening a pair of shafts 127 and 128, diametrically oppositely disposed, said shafts having bevel gears 129 and 130 rotatably mounted, respectively, at their inward ends. Said bevel gears mesh with similar bevel gears 131 and 132, mounted on output shafts 26 and 27 disposed in a plane with and at right angles to shafts 127 and 128. Teeth 126 mesh with gear 133 mounted on the input shaft of gear reduction box 28*a*.

Output shaft 28 is coupled to a set of four separately insulated selector switch contact arms 29, 30, 31 and 32 and to the set of two separately insulated limit switch contact arms 107, and 108. Said selector switch contact arms are associated respectively with arcuate contactor parts 29*a*, 30*a*, 31*a*, and 32*a* and are adapted to make and break contact with said contactor parts respectively and consecutively as shaft 28 rotates through an angular displacement of a little less than 360 degrees in a clockwise direction. Thus, when shaft 28 rotates in a clockwise direction, contact arm 29 first makes contact with arcuate part 29*a*, then, for a greater angle of rotation, corresponding to the arc length of arcuate part 29*a*, contact arm 29 moves off said arcuate part to break contact and at the same time contact arm 30 makes contact with its arcuate part 30*b*, etc.

Lift switch contact arms 107 and 108 are associated respectively with similar arcuate contactor parts 107*a* and 108*a*, slightly less than 360 degrees in length. Contact arm 107 breaks contact with its arcuate part 107*a* at the same time that the maximum ventilation rate selector switch 32, 32*a* open circuits upon the clockwise direction of rotation of shaft 28 in calling for increased ventilation. Contact arm 108 breaks contact with its arcuate contactor part 108*a* 3 minutes after minimum ventilation rate selector switch 29, 29*a* open circuits upon the counter-clockwise direction of rotation of shaft 28 in calling for decreased ventilation.

Arcuate parts 29*a*, 30*a*, 31*a*, and 32*a* are connected in common to the source of A. C. voltage supply ACG. The contact arms of said switches are connected to the ventilating fans control circuit hereinafter described.

The speed reduction from the motors 23 and 25 through the differential D and the gear reduction box 28*a* to the shaft 28, together with the length of the arcuate contactor parts 29*a*, 30*a*, 31*a* and 32*a* are such that when motor 23 is energized to turn shaft 28, contact arm 29 will make contact with arcuate part 29*a* after 3 minutes, arcuate part 29*a* will be traversed by its contact arm 29 during the next 5 minutes, arcuate part 30*a* will be traversed by its contact arm 30 during the next 4 minutes, arcuate part 31*a* will be traversed by its contact arm 31 during the next 3 minutes and arcuate part 32*a* will be traversed by its contact arm 32 during the next 5 minutes.

The lengths of the above given time elements are arbitrary, serving only to illustrate the relative speeds of the motors 23 and 25 and the contact arms 29, 30, 31 and 32. It is to be understood that the optimum values of these time elements for smooth and even ventilation control depend upon such factors as tunnel size, ventilating rates, and average tunnel traffic density.

Limit switch 107, 107*a* serves the purpose of automatically stopping motor 23 by opening its energizing circuit from said motor to ACG if said motor should remain energized long enough to move contact arm 32 off arcuate part 32*a* in the direction calling for increased ventilation (clockwise). At the same time, the length and disposition of arcuate part 108*a* is such that the energizing circuit through limit switch 108, 108*a* to the motor 25 is not opened, so that motor 25 can thereafter move the selector switch contact arms in the opposite direction.

Likewise, limit switch 108, 108*a* serves the purpose of automatically stopping motor 25 by opening its energizing circuit from said motor to ACG if said motor should remain energized for 3 minutes after contact arm 29 is moved off arcuate part 29*a* in the direction calling for decreased ventilation (counterclockwise). At the same time, the length and disposition of arcuate part 107*a* is such that the energizing circuit through limit switch 107, 107*a* to the motor 23 is not opened, so that motor 23 can thereafter move the selector switch contact arms in the opposite direction.

It is therefore evident that the shaft 28, moving the selector switch contact arms, can move through an angular distance less than 360 degrees, represented approximately by the length of the limit switch arcuate parts.

Since the selector switch contact arms 29, 30, 31 and 32 are ordinarily kept within the operating ranges of arcuate parts 29*a*, 30*a*, 31*a* and 32*a* by the automatic corrective action of increased or decreased ventilation, the limit switches 107, 107*a* and 108, 108*a* are opened only when the system is out of proper working order.

It has been found that haze in tunnels due to smokey vehicles exhaust gases may at times create a hazardous visibility condition while at the same time the CO content of the air is not at a high enough level to necessitate increased ventilation. Since increase in haziness due to exhaust smoke has been found to be approximately proportional to the vehicular density in the tunnel, the present invention contemplates the anticipation of a condition of poor visibility in the tunnel by automatically increasing the ventilation in proportion to the increase in traffic density.

To this end each lane in the tunnel is provided with a pair of vehicle actuated treadle switches 33, 34, and 35, 36; one at each end of their respective lanes (Figs. 2 and 3). Said treadle switches comprise the contact arms 33*a*, 33*b*; 34*a*, 34*b*; 35*a*, 35*b*; and 36*a*, 36*b*, each normally open and adapted to be momentarily closed-circuited when a vehicle axle passes over the treadle. Treadles 34 and 35 are connected in a circuit to operate a pulse actuated relay 37 adapted to rotatively advance a shaft 38 through an angular distance proportional to the number of pulses received. This energizing circuit can be traced from ACH through either of the treadle switches 34*a*, 34*b* or 35*a*, 35*b*, through the totalizer T1 wire 109 to relay 37, thence through wire 110 and limit switch 111, 111*a* to ACG. Thus shaft 38 will be turned through an angular distance proportional to the number of vehicles having entered the tunnel from both ends; N and S. There is included in this circuit a totalizer or memory circuit designated T1, similar to that detailed in applicant's Patent No. 2,268,925, issued January 6, 1942, titled Vehicle Counting Circuits, serving the function of separating pulses from treadles 34 and 35, if they should be actuated simultaneously.

Treadles 33 and 36 are similarly connected in a circuit to operate a pulse actuated relay 39 adapted to advance a shaft 40 through an angular distance proportional to the number of pulses received. This energizing circuit can be traced from ACH through either of the treadle switches 33*a*, 33*b* or 36*a*, 36*b* through the totalizer T2, wire 112 to relay 39, thence through wire 113 and limit switch 114, 114*a* to ACG. Thus shaft 40 will be turned through an angular distance proportional to the number of vehicles having left the tunnel from both ends; N and S. This circuit is also furnished with a totalizer circuit T2 similar to T1.

Shafts 38 and 40 are connected to another differential mechanism E, similar to differential mechanism D, which in turn is connected to a gear reduction box 41*a* having an output shaft 41.

Output shaft 41 is coupled to the set of two separately insulated limit switch contact arms 111 and 114. Output shaft 41 is also loosely coupled, as hereinafter described, to a set of four separately insulated selector switch contact arms 42, 43, 44 and 45 associated with arcuate contactor parts 42*a*, 43*a*, 44*a* and 45*a*. Said contact arms are adapted to make and break contact with said contactor parts respectively and consecutively as shaft 41 rotates through an angular displacement of a little less than 360 degrees in a clockwise direction. Thus, when shaft 41 rotates in a clockwise direction, contact arm 42 first makes contact with arcuate part 42*a*, then, for a greater angle of rotation, corresponding to the arc length of arcuate part 42*a*, contact arm 42 moves off said arcuate part to break contact and at the same time contact arm 43 makes contact with its arcuate part 43*a*, etc. As an illustrative example, the relationship between relay 37, the shaft 42 and the arcuate parts 42*a*, 43*a*, 44*a*, and 45*a* may be such that, proceeding from a condition when there are no cars in the tunnel and cars begin to enter, it will require pulses from 30 cars (60 pulses, one for each passage of an axle over the "entering" treadles, 34 and 35) for contact arm 42 to reach and make contact with contactor part 42*a*; at 60 cars, contactor arm 42 will have traversed and will move off contactor part 42*a* and at the same time contact arm 43 will reach and make contact with its contactor part 43*a*; at 90 cars, contactor arm 43 will have traversed and will move off contactor part 43*a* and at the same time contact arm 44 will reach and make contact with its contactor part 44*a*; at 110 cars, contactor arm 44 will have traversed and will move off contactor part 44*a* and at the same time contact arm 45 will reach and make contact with its contactor part 45*a*; and at 150 cars, contactor arm 45 will have traversed and move off contactor part 45*a*. The optimum relationships for the actuation of these selector switches for smooth, even, ventilation control here again depends upon such factors as the size of the tunnel, the ventilation rates, and the average tunnel traffic density.

Limit switch 111, 111*a* serves the purpose of automatically opening the energizing circuit to relay 37 through said switch to ACG if the relay should transmit pulses enough to move contact arm 45 off arcuate part 45*a* in the direction calling for increased ventilation. Assuming that the mechanical relationship between the pulse actuated relay 37 and the associated selector switches is such that for the maximum tunnel vehicular density, the selector switch 45 for maximum ventilation will not move off its contactor part 45*a* (in the above example the maximum vehicular density would be less than 150 cars), it is evident that limit switch 111, 111*a* will be opened only when the system is in improper working condition. This condition might occur for instance if relay 39 should fail to operate, thereby failing to rotate shaft 41 counterclockwise as cars leave the tunnel.

Similarly, limit switch 114, 114*a* serves the purpose of automatically opening the energizing circuit to relay 39 through said switch to ACG if the system should operate improperly so that contact arm 114 is moved off contactor part 114*a* in the counterclockwise direction of rotation.

Inasmuch as a tunnel ventilating system is not instantaneously responsive upon changing its ventilation rate to change the condition of the tunnel air, means is provided in connection with the switch contacts 42, 43, 44 and 45 so that the condition of a lesser number of cars in the tunnel is required to move said contacts off their respective contactor parts than was required to close the switches for increased ventilation. Otherwise, single cars, alternately entering and leaving the tunnel could alternately cause the ventilation to change from one rate to another. Thus, in the above example for instance, though the switches make contact respectively at 30, 60, 90 and 110 cars, they break contact, when rotated in the counter-clockwise direction, at 15 cars less each, or 95, 75, 45 and 15 cars.

Figs. 4 and 5 show the mechanical construction of contact arm 42 on shaft 41. Contact arms 43, 44 and 45 are similarly constructed. Mounting member 115 is rotatably held in position between washers 116 and 117 fixed on said shaft respectively as by set screws 118 and 119. Washer 118 is furnished with a fixed pin 120 extending into a slot 121 in mounting member 115. Contact arm 42, insulated by insulation pieces 122 and 123, is secured to said mounting member by screws 124. Said slot is of such a length as to allow rotational motion of said mounting member and contact arm 42 in an amount corresponding to the difference between the number of cars required to make contact in the clockwise direction and to break contact in the counter-clockwise direction.

Arcuate parts 42*a*, 43*a*, 44*a* and 45*a* are connected in common to the source of A. C. voltage supply ACG. The contact arms of said switches are connected to the ventilating fans control circuit described below.

The fan control circuit comprises two sets of relays;

fan control relays 54, 55, 56 and 57 controlling ventilation in accordance with tunnel CO density and fan control relays 58, 59, 60 and 61 controlling ventilation in accordance with tunnel vehicular density. Said control relays have associated with them indicator relays 46, 47, 48, 49 and 50, 51, 52 and 53 respectively.

Said indicator relays each have associated with them a normally open switch designated respectively 46*a*, 46*b*; 47*a*, 47*b*; etc., adapted to be closed when its relay is energized. The "*a*" terminal of each of said switches is connected to ACH. The "*b*" terminals of said switches are connected respectively in series with signal lamps 46*c*, 47*c*, etc. and resistors 46*d*, 47*d*, etc., to ACG. It is evident that when any one of the indicator relays is energized its corresponding signal lamp will be lit, the circuit being from ACH through the closed relay switch, the lamp and the series resistor to ACG.

All of said indicator relays have one of their energizing terminals connected to ACG. Relay 46 has its other energizing terminal connected by wires 62 and 63 to contact arm 29. Relay 47 has its other energizing terminal connected by wires 64 and 65 to contact arm 30. Relay 48 has its other energizing terminal connected by wires 66 and 67 to contact arm 31, and relay 49 has its other energizing terminal connected by wire 68 to contact arm 32.

Relay 50 has its other energizing terminal connected by wire 69 to contact arm 42. Relay 51 has its other energizing terminal connected by wire 70 to contact arm 43. Relay 52 has its other energizing terminal connected by wire 71 to contact arm 44. Relay 53 has its other energizing terminal connected by wire 72 to contact arm 45.

Means is provided to increase the brightness of said indicator lamps upon the energization of their respective associated fan control relays. To this end, each of said fan control relays is provided with a switch, designated 54*a*, 54*b*; 55*a*, 55*b*; etc. normally open but adapted to be closed when its relay is energized, connected in series between ACG and a tap on said respective series resistor. Thus, when one of said switches is closed it shorts out part of the series resistance, eliminating part of the voltage drop in said resistor and thereby increasing the current through and the brightness of the lamp.

For purposes hereinafter explained each of said fan control relays has associated with it a set of three switches, normally open but adapted to be closed when its relay is energized. Said switches are designated 54*c*, 54*d*; 54*e*, 54*f* and 54*g*, 54*h* for relay 54, etc.

Relay 55 has further associated with it a pair of normally closed switch contact arms 55*i*, 55*j* adapted to be opened when said relay is energized.

Relay 56 has further associated with it two pairs of normally closed switch contact arms 56*i*, 56*j*, and 56*k*, 56*l*, adapted to be opened when said relay is energized.

Relay 57 has further associated with it three pairs of normally closed switch contact arms 57*i*, 57*j*; 57*k*, 57*l*; and 57*m*, 57*n*, adapted to be opened when said relay is energized.

Relay 59 has further associated with it a pair of normally closed switch contact arms 59*i*, 59*j*, adapted to be opened when said relay is energized.

Relay 60 has further associated with it two pairs of normally closed switch contact arms 60*i*, 60*j* and 60*k*, 60*l*, adapted to be opened when said relay is energized.

Relay 61 has further associated with it three pairs of normally closed switch contact arms, 61*i*, 61*j*, 61*k*, 61*l* and 61*m*, 61*n*, adapted to be opened when said relay is energized.

One terminal of each of said control relays is connected to ACG. The remaining energizing terminal of relay 54 is connected by wire 73 to one terminal of switch 61*i*, 61*j*, thence from the other terminal of said switch through wire 74 to one terminal of switch 60*i*, 60*j*, thence, from the other terminal of said switch through wire 75 to one terminal of switch 59*i*, 59*j*, and thence from the other terminal of said switch through wires 62 and 63 to contact arm 29.

The remaining energizing terminal of relay 55 is connected by wire 76 to one terminal of switch 61*k*, 61*l*, thence from the other terminal of said switch through wire 77 to one terminal of switch 60*k*, 60*l*, and thence, from the other terminal of said switch, through wires 64 and 65 to contact arm 30.

The remaining energizing terminal of relay 56 is connected by wire 78 to one terminal of switch 61*m*, 61*n*, and thence, from the other terminal of said switch, through wires 66 and 67 to contact arm 31.

The remaining energizing terminal of relay 57 is connected through wires 79 and 68 to contact arm 32.

The remaining energizing terminal of relay 58 is connected by wire 80 to one terminal of switch 57*i*, 57*j*, thence from the other terminal of said switch through wire 81 to one terminal of switch 56*i*, 56*j*, thence, from the other terminal of said switch through wire 82 to one terminal of switch 55*i*, 55*j*; and thence from the other terminal of said switch through wires 83 and 69 to contact arm 42.

The remaining energizing terminal of relay 59 is connected by wire 84 to one terminal of switch 57*k*, 57*l*, thence from the other terminal of said switch through wire 85 to one terminal of switch 56*k*, 56*l*, and thence, from the other terminal of said switch through wires 86 and 70 to contact arm 43.

The remaining energizing terminal of relay 60 is connected by wire 87 to one terminal of switch 57*m*, 57*n* and thence, from the other terminal of said switch, through wires 88 and 71 to contact arm 44.

The remaining energizing terminal of relay 61 is connected through wires 89 and 72 to contact arm 45.

One terminal of each of the switches 54*c*, 54*d*; 54*e*, 54*f*; 54*g*, 54*h*; 55*c*, 55*d*; 55*e*, 55*f*; 55*g*, 55*h*, etc., associated with the control relays, is connected to ACG. The remaining terminals of each of said switches are connected respectively to one terminal each of manually operated switches 54*r*, 54*s*; 54*t*, 54*u*; 54*x*, 54*y*; 55*r*, 55*s*; 55*t*, 55*u*; 55*x*, 55*y*, etc.

The remaining terminals of manually operated switches 54*r*, 54*s*; 55*r*, 55*s*; 58*r*, 58*s* and 59*r*, 59*s* are connected in common to a wire 89.

The remaining terminals of manually operated switches 56*r*, 56*s*; 57*r*, 57*s*; 60*r*, 60*s* and 61*r*, 61*s* are connected in common to a wire 90.

The remaining terminals of manually operated switches 54*t*, 54*u*; 55*t*, 55*u*; 58*t*, 58*u*, and 59*t*, 59*u* are connected in common to a wire 91.

The remaining terminals of manually operated switches 56*t*, 56*u*; 57*t*, 57*u*; 60*t*, 60*u* and 61*t*, 61*u* are connected in common to a wire 92.

The remaining terminals of manually operated switches 54*x*, 54*y*; 55*x*, 55*y*; 58*x*, 58*y* and 59*x*, 59*y* are connected in common to a wire 93.

The remaining terminals of manually operated switches 56*x*, 56*y*; 57*x*, 57*y*; 60*x*, 60*y* and 61*x*, 61*y* are connected in common to a wire 94.

Wires 89 and 90 connect into the No. 1 fan auxiliary speed control circuit hereinafter described, wire 89 controlling medium speed and wire 90 controlling high speed.

Wire sets 91, 92 and 93, 94 respectively connect into similar auxiliary speed control circuits (not shown) for controlling medium and high speeds of fan No. 2 and medium and high speeds of fan No. 3.

The auxiliary speed control circuit comprises auxiliary control relays 95 and 96 for medium and high speed respectively and fan relays 97, 98 and 99 for low, medium and high fan speeds respectively (fan No. 1).

Relay 95 has associated with it a switch 95*a*, 95*b*, normally open but adapted to be closed when said relay is energized and a switch 95*c*, 95*d* normally closed but adapted to be opened when said relay is energized.

Relay 96 has associated with it a switch 96*a*, 96*b*, normally open but adapted to be closed when said relay is energized, and a switch 96*c*, 96*d*, normally closed but adapted to be opened when said relay is energized.

Relays 97, 98 and 99 each have associated with them respectively switches 97*a*, 97*b*; 98*a*, 98*b* and 99*a*, and 99*b*, normally open but adapted to be closed when their respective relays are energized.

One of the energizing terminals of each of the relays 95, 96, 97, 98 and 99 is connected to ACH.

Switch contact 95*d*, associated with relay 95 is connected by wire 100 to switch contact 96*d* associated with relay 96.

Switch contact 95*c* associated with relay 95 is connected by wire 101 to the remaining energizing terminal of relay 97.

Switch contact 95*b* associated with relay 95 is connected by wire 102 to the remaining energizing terminal of relay 98.

Switch contact 96*b* associated with relay 96 is connected by wire 103 to the remaining energizing terminal of relay 99.

Switch 97*a*, 97*b* serves to close a circuit to operate fan No. 1 at low speed, switch 98*a*, 98*b* serves to close a circuit to operate fan No. 1 at medium speed and switch 99*a*, 99*b* serves to close a circuit to operate fan No. 1 at high speed.

The direct current-shunt wound motor for fan No. 1 has an armature 134 connected to a source of energizing voltage DC+, DC— by wires 135 and 136. Said motor has a field circuit comprising field winding 137 connected in series with speed control resistor 138, said circuit being connected in parallel with said armature. Speed is controlled by shorting out decreasing portions of said resistance at taps 138*a*, 138*b* and 138*c* thereby varying the field current while the armature 134 remains at a constant voltage. Thus switch 97*a*, 97*b*, having contact arm 97*b* connected by wire 139 to tap 138*a*, will short out the resistance portion from 138*a* to DC— to operate the fan motor at low speed; switch 98*a*, 98*b*, having contact arm 98*b* connected by wire 140 to tap 138*b*, will short out the resistance portion from 138*b* to DC— to operate the fan motor at medium speed; and switch 99*a*, 99*b*, having contact arm 99*b* connected by wire 141 to tap 138*c*, will short out the resistance portion from 138*c* to DC— to operate the fan motor at high speed. The speed control circuits for fans Nos. 2 and 3 are equivalent to that for fan No. 1.

It will now be evident that when neither relay 95 nor relay 96 is energized, relay 97 will be energized, thereby closing switch 97*a*, 97*b*, to operate fan No. 1 at low speed, the minimum ventilation speed. This energization circuit can be traced from ACG through switch 96*c*, 96*d*, wire 100, switch 95*c*, 95*d*, wire 101, through relay 97 to ACH. When relay 95 is energized, relay 98 will become energized, thereby closing switch 98*a*, 98*b* to operate fan No. 1 at medium speed. This circuit is from ACG through switch 95*a*, 95*b*, wire 102 through relay 98 to ACH. At the same time low speed switch 97*a*, 97*b* will be opened, since the energizing circuit to its control relay through switch 95*a*, 95*b* will be open.

When relay 96 is energized, relay 99 will become energized, thereby closing switch 99*a*, 99*b* to operate fan No. 1 at high speed. This circuit is from ACG through switch 96*a*, 96*b*, wire 103, through relay 99 to ACH.

Considering the operation of the system as a whole, assume for example that the manual switches 54*r*, 54*s*; 55*r*, 55*s*; 55*t*, 55*u*; 56*r*, 56*s*; 57*r*, 57*s*; 57*t*, 57*u*; 58*r*, 58*s*; 59*r*, 59*s*; 59*t*, 59*u*; 60*r*, 60*s*; 61*r*, 61*s* and 61*t*, 61*u* are closed, as indicated by the dotted lines between their respective terminals. In this example, fan No. 3, all of its manual switches *x*, *y* in its control circuit remaining open, serves the function of stand-by apparatus, to be used in case either of fans No. 1 or No. 2 must be shut down for service, or in case unusual conditions require the additional ventilation that is obtainable by using fan No. 3.

Let us further assume that the CO content in the tunnel is increasing so to successively close and open respectively the switches 29, 29*a*; 30, 30*a*; 31, 31*a* and 32, 32*a*. In this instance, since none of the relays 59, 60, or 61 is energized so as to open its switches through which relays 54, 55 and 56 have energizing circuits, relays, 54, 55, 56 and 57 will be successively energized during the length of time required for its associated selector contactor arm to traverse the length of its associated arcuate contact or part. Thus, for the first ventilation step relay 54 is energized, closing its switch 54*c*, 54*d*, completing a circuit to relay 95 from ACG, through said switch, through switch 54*r*, 54*s*, wire 89, through relay 95 to ground. As hereinbefore described, fan No. 1 will be switched to operate at speed No. 2 for increased ventilation. For the second ventilation step, relay 55 only is energized, closing switches 55*c*, 55*d* and 55*e*, 55*f* to control both fans No. 1 and No. 2 at medium speed. For the third step for increased ventilation relay 56 alone is energized, closing switch 56*r*, 56*s* to control fan No. 1 at high speed and for the fourth step, furnishing maximum ventilation, relay 57 alone is energized closing switches 57*r*, 57*s* and 57*t*, 57*u* to control fans No. 1 and No. 2 to operate at high speed.

If it is assumed that traffic volume within the tunnel instead of CO content is increasing, the switches 42, 42*a*, 43, 43*a*, 44, 44*a*, and 45, 45*a* will be operated successively as hereinbefore described and the speed of fans No. 1 and No. 2 will be controlled, in the same manner as outlined above, through the operation of relays 58, 59, 60 and 61 instead of relays 54, 55, 56 and 57.

However, it will now be evident that, because of the interlocking switches *i*, *j*; *k*, *l* and *m*, *n* associated with the relays 55, 56, 57, 59, 60, and 61, the CO control relays 54, 55, 56 and 57 and the traffic volume control relays 58, 59, 60 and 61 cannot act independently to call for different fans speeds. Only the control function calling for the greater speed will be operative.

Suppose, for instance, that traffic volume relay 61 is energized, calling for maximum ventilation. If CO control rotary switch 31, 31*a*, is closed at the same time, calling for an intermediate speed, this cannot complete a circuit to its associated relay 56, since the energizing circuit for relay 56 is in circuit with switch 61*m*, 61*n* of relay 61; and since relay 61 is energized, this switch is open. Therefore, there is no completed circuit from ACG through switch 31, 31*a*, wire 67, wire 66, open switch 61*m*, 61*n*, wire 78 through relay 56 to ground.

Likewise, for any other combination of speeds called for by the two sets of rotary switches 29, 29*a*; 30, 30*a*; 31, 31*a*; 32, 32*a* and 42, 42*a*; 43, 43*a*; 44, 44*a*; 45, 45*a*; the relay associated with the higher speed called for by one set of said rotary switches open circuits all lower order speed circuits controlled by the other set of said rotary switches, thereby preventing the CO control circuit and the traffic density control circuit from interacting so as to call for different ventilation rates at the same time. This is necessary, since if the ventilation rate called for by one of said control circuits is greater than the other, it will be more than sufficient to satisfy the ventilation rate called for by said other control circuit.

The purpose of the indicator lamps 46*c*, 47*c*, 48*c*, etc., will now be evident. As hereinbefore explained, when their associated indicator relays 46, 47, 48 etc. are energized, the respective lamps will be lighted at half brilliance, indicating the ventilation rates called for by the two control functions, which, in turn is an indication of the CO content and the traffic density in the tunnel. Also, as hereinbefore detailed, the lamp associated with the particular fan control relay controlling ventilation will be lighted at full brilliance, serving to show at a glance which function is controlling ventilation and what the ventilation speed is.

It will thus be seen that there is provided a system in which the several objects of this invention are achieved and which is well adapted to meet the conditions of practical use.

As various possible embodiments might be made of the above invention, and as various changes might be made in the embodiment above set forth, it is to be understood that all matter herein set forth, or shown in the accompanying drawings is to be interpreted as illustrative and not in a limiting sense.

Having thus described our invention we claim as new and desire to secure by Letters Patent:

1. In a tunnel for vehicular transit the combination comprising variable blowing means adapted to ventilate said tunnel, a first relay, a second relay, means to actuate the first relay at a certain predetermined concentration of carbon monoxide in the air at one end of said tunnel and to actuate the second relay at a certain greater predetermined concentration of carbon monoxide in the air at said one end of said tunnel, a third relay, a fourth relay, means to actuate the third relay at a certain predetermined concentration of carbon monoxide in the air at the other end of said tunnel and to actuate the fourth relay at a certain greater predetermined concentration of carbon monoxide in the air at said other end of said tunnel, a first electric motor, a circuit controlled by said second and fourth relays to energize said first motor, a second motor, a circuit controlled by said first and third relays to energize said second motor, a differential mechanism having two input shafts and an output shaft, said differential mechanism being driven at its input shafts each by said first and second motors, a plurality of rotary switches mechanically connected to said output shaft, means controlled by said rotary switches to vary said blowing means, said blowing means comprising a plurality of blowers, said last means comprising a plurality of electric circuits, one for each of said blowers, and a plurality of manually operated control switches, one for each of said electric circuits, for selectively cutting out said blowers.

2. In a tunnel for vehicular transit the combination comprising a variable air blowing means adapted to ventilate said tunnel including a plurality of blowers, a first lane in said tunnel for vehicle passage in one direction, a second lane in said tunnel for vehicle passage in the opposite direction, a first and second vehicle operated treadle switch, one at each end of said tunnel, and positioned, one in the first lane and one in the second lane, to be operated respectively when vehicles enter said tunnel at either end in the two lanes, a third and fourth vehicle operated treadle switch, one at each end of said tunnel and positioned, one in the second lane and one in the first lane, to be operated respectively when vehicles in the two lanes leave said tunnel at either end, a first pulse actuated stepping relay, a circuit, controlled by said first and second treadle switches to actuate said first stepping relay, a second pulse actuated stepping relay, a circuit controlled by said third and fourth treadle switches, to actuate said second stepping relay, a differential mechanism having two input shafts and an output shaft, said differential mechanism being driven at its input shafts each by said first and second stepping relays, a plurality of rotary switches mechanically connected to said output shaft, and means controlled by said rotary switches to control said plurality of air blowers.

3. In a tunnel for vehicular transit the combination comprising a variable air blowing means adapted to ventilate said tunnel including a plurality of blowers, a first lane in said tunnel for vehicle passage in one direction a second lane in said tunnel for vehicle passage in the opposite direction, a first and second vehicle operated treadle switch, one at each end of said tunnel, and positioned, one in the first lane and one in the second lane, to be operated respectively when vehicles enter said tunnel at either end in the two lanes, a third and fourth vehicle operated treadle switch, one at each end of said tunnel and positioned, one in the second lane and one in the first lane, to be operated respectively when vehicles in the two lanes leave said tunnel at either end, a first pulse actuated stepping relay, a circuit controlled by said first and second treadle switches to actuate said first stepping relay, a second pulse actuated stepping relay, a circuit controlled by said third and fourth treadle switches, to actuate said second stepping relay, a differential mechanism having two input shafts and an output shaft, said differential mechanism being driven at its input shafts each by said first and second stepping relays, a plurality of rotary switches mechanically connected to said output shaft, means controlled by said rotary switches to control said plurality of air blowers, and signal means controlled by said rotary switches to indicate the operating position of said rotary switches.

References Cited in the file of this patent

UNITED STATES PATENTS

| | | |
|---|---|---|
| 561,271 | Ongley | June 2, 1896 |
| 929,115 | Schlacks | July 27, 1909 |
| 1,199,485 | Moran | Sept. 26, 1916 |
| 1,743,175 | Wensley et al. | Jan. 14, 1930 |
| 2,114,401 | Price | Apr. 19, 1938 |
| 2,219,391 | Jacobson | Oct. 29, 1940 |
| 2,282,210 | Plum | May 5, 1942 |
| 2,339,987 | Evans | Jan. 25, 1944 |
| 2,470,511 | McDill | May 17, 1949 |
| 2,533,339 | Willenborg | Dec. 12, 1950 |